United States Patent
Abe et al.

(10) Patent No.: US 8,917,472 B2
(45) Date of Patent: Dec. 23, 2014

(54) CONTROLLING A TAPE SPEED TO MANAGE A TAPE DRIVE BUFFER

(71) Applicant: International Business Machines Corporation, Armonk, NY (US)

(72) Inventors: Atsushi Abe, Tokyo (JP); Takashi Katagiri, Tokyo (JP); Hironobu Nagura, Tokyo (JP); Yutaka Oishi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/943,710

(22) Filed: Jul. 16, 2013

(65) Prior Publication Data
US 2014/0022665 A1    Jan. 23, 2014

(30) Foreign Application Priority Data

Jul. 17, 2012 (JP) .................................. 2012-159002

(51) Int. Cl.
G11B 15/46 (2006.01)
G11B 15/48 (2006.01)
G11B 15/44 (2006.01)

(52) U.S. Cl.
CPC .............. *G11B 15/442* (2013.01); *G11B 15/46* (2013.01)

USPC ....................................... 360/73.06; 360/74.1

(58) Field of Classification Search
None
See application file for complete search history.

(56) References Cited

U.S. PATENT DOCUMENTS

| 5,412,780 | A * | 5/1995 | Rushton ......................... 711/113 |
| 2003/0001036 | A1 * | 1/2003 | Beavers et al. ............ 242/334.5 |
| 2006/0256466 | A1 | 11/2006 | Katagiri et al. |
| 2008/0285166 | A1 | 11/2008 | Katagiri et al. |
| 2009/0125649 | A1 * | 5/2009 | Goker et al. .................... 710/57 |

FOREIGN PATENT DOCUMENTS

JP    2006318571    11/2006

OTHER PUBLICATIONS

Information Materials for IDS, dated Feb. 2012, 1 pp.

* cited by examiner

*Primary Examiner* — Andrew L Sniezek
(74) *Attorney, Agent, or Firm* — David W. Victor; Konrad, Raynes, Davda and Victor LLP

(57) ABSTRACT

Provided are a storage device, method, and program for controlling a tape speed to manage a tape drive buffer. A tape speed is increased from a current tape speed to a target tape speed on a predetermined speed-change timing to control the reading or writing of data between the buffer and the tape medium.

22 Claims, 9 Drawing Sheets

Change Timing for Tape Speed S

Timing of Speed Change During Write Operation (Avoiding Full Buffer With Th > Td)

Notes) Parameter Definition
- $A[m/s^2]$: Tape Medium Acceleration
- $S(i)$ ($i = 0, 1, ... 9$): Tape Medium Speed
- Th [MB/s]: Host Transfer Rate
- Td [MB/s]: Drive Transfer Rate
- T [s]: Required Acceleration Time
- α: Device Margin Amount of Incoming Data Transfer During Acceleration Notes) Full Area: Areas at Least Partially Filled with Buffer Data Prior Art Technique (Back Hitched)

Tape Intervals in Prior Art Technique

FIG. 4a
| Case | Drive Operation | Host Transfer Rate (Th)/ | Drive Transfer Rate (Td) | Tape Speed S(n) | Buffer State to Be Avoided at Start of Change |
|---|---|---|---|---|---|
| 1 | Write | High > | Low | Increasing | Full |
| 2 | Read | High > | Low | Increasing | Empty |
FIG. 4b
Technique of Present Invention (No Back Hitching)
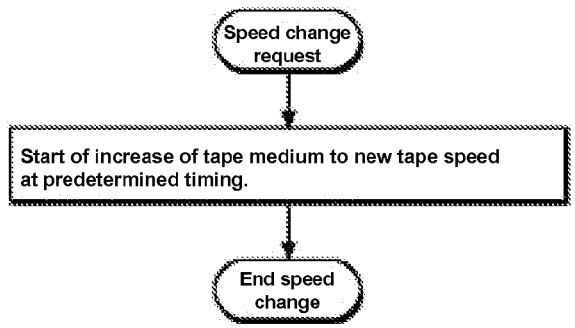
FIG. 4c
Tape Intervals in Technique of the Present Invention
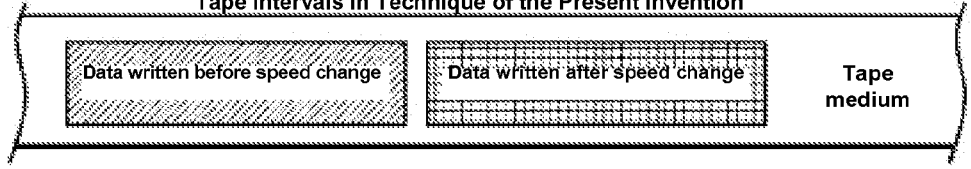

FIG. 5

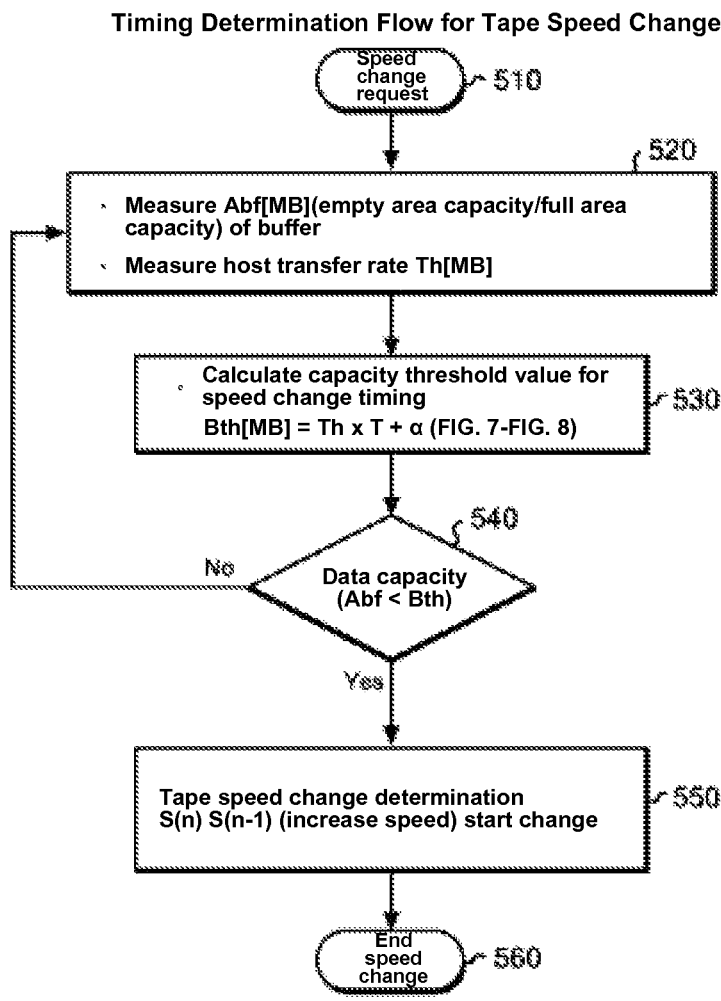

Notes)
1. Known Parameters
   • Tape Acceleration A[m/s²]
   • Current Tape Speed S(n) [m/s] Drive Transfer Rate Td [MB/s]
   • Target Tape Speed S(n-1)
   • Device Margin α
2. Measured Parameters (Step 520)
   • Buffer empty area/full area capacity Abf [MB]
   • Host Transfer Rate Th [MB/s]
3. Calculated Parameters (Step 530)
   •Required Acceleration Time T = S(n-1)-S(n)/A [s]
   •Empty area/full area capacity threshold Bth = Th x T + α

FIG. 7a
Change Timing for Tape Speed S

Timing of Speed Change During Write Operation (Avoiding Full Buffer With Th > Td)

Notes) Parameter Definition
- $A[m/s^2]$: Tape Medium Acceleration
- $S(i)$ (i = 0, 1, ... 9): Tape Medium Speed
- Th [MB/s]: Host Transfer Rate
- Td [MB/s]: Drive Transfer Rate
- T [s]: Required Acceleration Time
- α: Device Margin

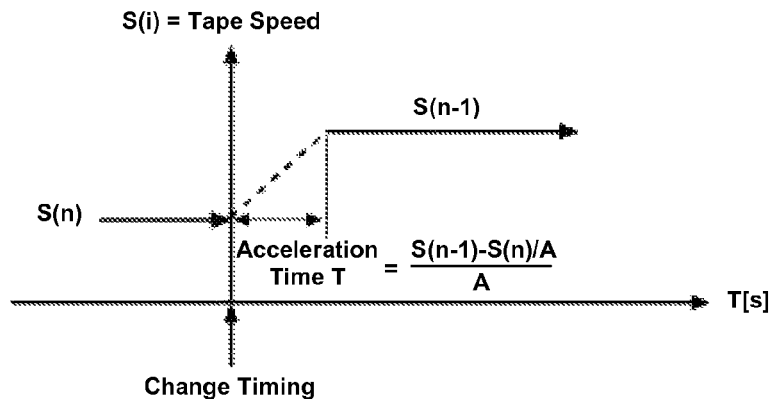

FIG. 7b
Amount of Incoming Data Transfer During Acceleration

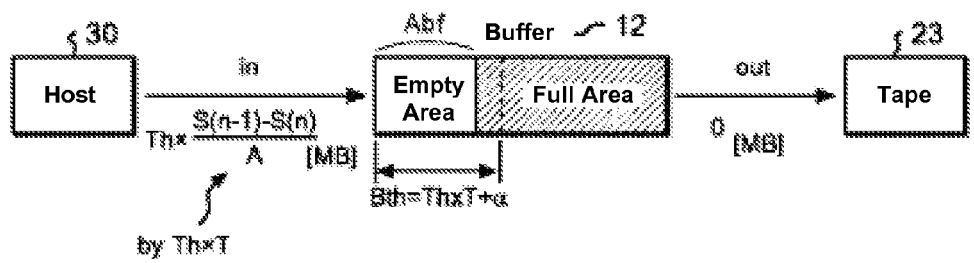

Notes) Full Area: Areas at Least Partially Filled with Buffer Data

FIG. 8a
Change Timing for Tape Speed S

Timing of Speed Change During Read Operation (Avoiding Empty Buffer With Th > Td)

Notes) Parameter Definition

- $A[m/s^2]$: Tape Medium Acceleration
- $S(i)$ ($i = 0, 1, \ldots 9$): Tape Medium Speed
- Th [MB/s]: Host Transfer Rate
- Td [MB/s]: Drive Transfer Rate
- T [s]: Required Acceleration Time
- α: Device Margin

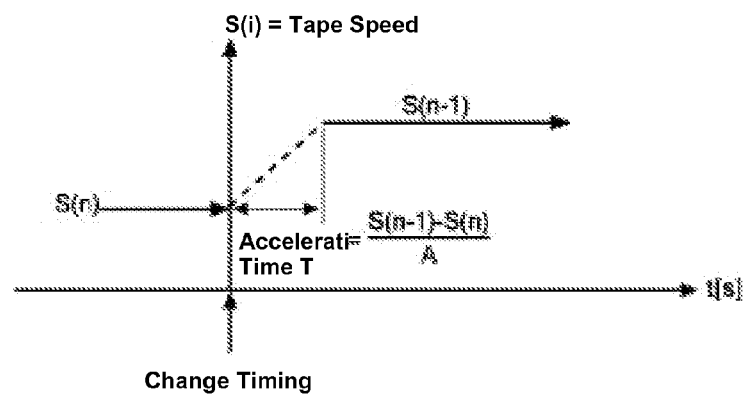

Change Timing

FIG. 8b
Amount of Incoming Data Transfer During Acceleration

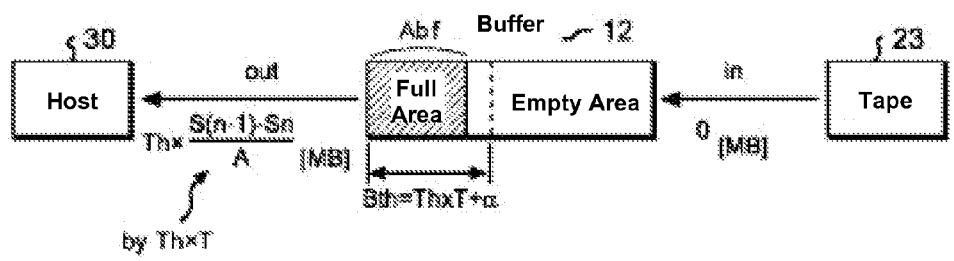

Notes) Full Area: Areas at Least Partially Filled with Buffer Data

Improvement in Data Transfer Rate When Present Invention Applied to Writing Using Host Transfer Rate Notes)

* Prior Art: Back Hitching During Matching Technique

Vertical Axis: Average Transfer Rate When File Sizes Indicated in Horizontal Axis are Repeatedly Written

CONTROLLING A TAPE SPEED TO MANAGE A TAPE DRIVE BUFFER

CROSS-REFERENCE TO RELATED FOREIGN APPLICATION

This application is a non-provisional application that claims priority benefits under Title 35, United States Code, Section 119(a)-(d) from Japanese Patent Application entitled "STORAGE DEVICE FOR STORING DATA SEQUENTIALLY AND TAPE SPEED CHANGING METHOD THEREFOR" by Yutaka OISHI, Hironobu NAGURA, Takashi KATAGIRI, and Atsushi ABE, having Japanese Patent Application Serial No. JP2012-159002, filed on Jul. 17, 2012, which Japanese Patent Application is incorporated herein by reference in its entirety.

BACKGROUND OF THE INVENTION

1. Field of the Invention

The present invention relates to a storage device, method, and program for controlling a tape speed to manage a tape drive buffer.

2. Description of the Related Art

When data is being written from a host, data is stored in the buffer memory (also called a buffer) of the tape storage device (tape drive). When the writing speed of the drive to the tape (drive transfer rate) is slower than the data reading speed of the host (host transfer rate), the buffer memory becomes full. When the buffer memory becomes full, the tape drive usually rewinds the tape medium in an operation called "backhitch". Backhitch takes a few seconds (2 to 5 seconds). During the backhitch operation, the tape drive cannot write data to the tape medium or read data from the buffer. Thus, the backhitch operation adversely affects the overall data transfer rate because the host has to wait to read and write during the backhitch. When data is read by the host, the tape drive performs a backhitch when the buffer memory becomes empty.

FIGS. 1a and 1b show a tape speed changing method of the prior art. FIG. 1a shows a backhitch operation performed when the drive speed is changed. The tracking capability of the drive transfer rate is not sufficient with respect to the host transfer rate when the host transfer rate is significantly greater than the host transfer rate, or there are intermittent fluctuations in the host transfer rate. The host has to wait to write (2-5 seconds) during a backhitch. FIG. 1b shows intervals of written data on a tape being minimized before and after a tape speed change during writing performed before and after a backhitch operation.

SUMMARY

Provided are a storage device, method, and program for controlling a tape speed to manage a tape drive buffer. A tape speed is increased from a current tape speed to a target tape speed on a predetermined speed-change timing to control the reading or writing of data between the buffer and the tape medium.

BRIEF DESCRIPTION OF THE DRAWINGS

FIGS. 4a, 4b, 4c provide an embodiment in which the tape speed is increased.

FIG. 5 provides an embodiment of a flowchart for determining the timing when a tape speed change has been initiated.

FIGS. 7a and 7b provide an embodiment of a conceptual diagram for determining the speed change timing so that the buffer does not become full during writing.

FIGS. 8a and 8b provide an embodiment of a conceptual diagram for determining the speed change timing so that the buffer does not become empty during reading.

DETAILED DESCRIPTION

Figure 1A:
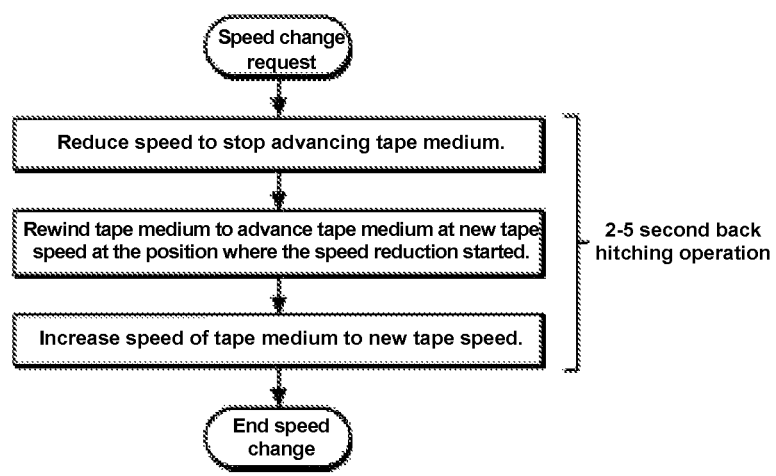
FIGS. 1a and 1b show a tape speed changing method of the prior art.
Figure 1B:
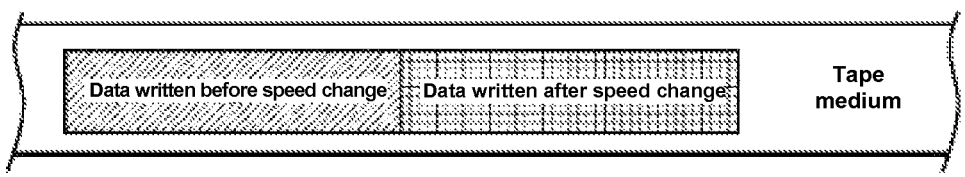

Japanese Patent Application No. 2006-318571, also published as U.S. patent application No. 2006/256466, describes a speed matching technique in which the drive transfer rate is adjusted to the host transfer rate. However, because the matching technique uses a backhitch operation, overall read/write performance is adversely affected.

The adverse effect on performance can be avoided, for example, by doubling the capacity of the buffer memory. However, when the host transfer rate is greater than the drive transfer rate, host performance has to be improved from the standpoint of drive performance. Unfortunately, increasing the capacity of the buffer memory also increases both manufacturing costs and power consumption.

The described embodiments relate to a storage device, method and program for improving data transfer rate by a storage device used to sequentially store data. More specifically, the described embodiments determine the timing for switching tape speeds when a tape storage device is used to read and write data to a tape medium.

The described embodiments provide a storage device, method and program for determining the timing for changing the tape speed in order to improve reading and writing performance.

Described embodiments provide a tape storage device which includes: a buffer for temporarily storing data read from and written to a higher-level device; a storage medium (tape medium) for sequential storage of a plurality of data units; and a read/write control unit for reading and writing a plurality of data units sequentially in accordance with a read or write request from a higher-level device (host), the control unit controlling the reading and writing of data between the buffer and the tape medium to increase the tape speed (acceleration A) from the current tape speed $S(n)$ to a target tape speed $S(n-1)$ on a predetermined speed-change timing and matching the drive transfer rate Td to the host transfer rate Th without a backhitch so that the host transfer rate for data with the higher-level device is greater than the drive transfer rate for data with the tape medium, and so that the buffer does not become full during writing and the buffer does not become empty during reading.

In further embodiments, the predetermined speed-change timing is determined by comparing the currently-determined capacity Abf of an empty area (during writing) or a full area (during reading) of the buffer to a capacity threshold value Bth provided for the inflow data amount to the buffer (during writing) Th×T or the outflow data amount from the buffer (during reading) Th×T in the required acceleration time T so the data capacity of the buffer is not full (during writing) or empty (during reading) at the time (arrival time) of the change to the target tape speed S(n−1).

In further embodiments, the capacity threshold value Bth is calculated as a product of the host transfer rate Th and the required acceleration time T=(S(n−1)−S(n))/A.

In further embodiments, the data-change timing during writing is such that the empty capacity Abf of the buffer determined at the current time is less than the capacity threshold value Bth calculated based on the inflow data amount.

In further embodiments, the data-change timing during reading is such that the full capacity Abf of the buffer determined at the current time is less than the capacity threshold value Bth calculated based on the outflow data amount.

In further embodiments, the read/write control unit selects a target tape speed S(n−1) so that the tape intervals at which data is written before and after the speed change are within a standard value (for example, 4 m).

In further embodiments, the read/write control unit selects a target tape speed S(n−1) so that the skip distance ((S(n)+S(n−1))/2)×T) is within the ECC recovery range (for example, 15-20% from the beginning of the tape) in the required acceleration time T from the current tape speed to the target tape speed S(n−1) at the speed-change timing.

In further embodiments, a value in which the storage device margin a has been added to the capacity threshold value is compared to the measured capacity Abf as the new capacity threshold value Bth.

Further embodiments provide a read/write control method for reading and writing a plurality of data units sequentially in accordance with a read or write request from a higher-level device (host). In this method, the reading and writing of data between the buffer and the tape medium is controlled to increase the tape speed (acceleration A) from the current tape speed S(n) to a target tape speed S(n−1) on a predetermined speed-change timing and to match the drive transfer rate Td to the host transfer rate Th without a backhitch so that the host transfer rate for data with the higher-level device is greater than the drive transfer rate for data with the tape medium, and so that the buffer does not become full during writing and the buffer does not become empty during reading.

Yet further embodiments provide a read/write control program for reading and writing a plurality of data units sequentially in accordance with a read or write request from a higher-level device (host). In this program, the reading and writing of data between the buffer and the tape medium is executed by a controller to increase the tape speed (acceleration A) from the current tape speed S(n) to a target tape speed S(n−1) on a predetermined speed-change timing and to match the drive transfer rate Td to the host transfer rate Th without backhitch so that the host transfer rate for data with the higher-level device is greater than the drive transfer rate for data with the tape medium, and so that the buffer does not become full during writing and the buffer does not become empty during reading.

With the described embodiments, the data transfer rate of a storage device used to sequentially store data can be improved, especially when the host transfer rate is greater than the drive transfer rate.

The following is an explanation of an embodiment (example) in which data is written to and read from a tape drive by a host.

When the host transfer rate is faster than the drive transfer rate, reading and writing is performed so that the buffer does not become full during data writing and the buffer does not become empty during data reading. The described embodiments are characterized by the speed-change timing for the drive transfer rate, that is, the speed of the tape medium. In described embodiments, backhitch is avoided and the tape speed is accelerated on a predetermined timing in advance. Once a change in the tape speed has been completed, the tape speed is changed on a predetermined change-start timing in order to keep the buffer from becoming full during writing or empty during reading. Described embodiments are preferably realized in a tape drive as a firmware function.

Figure 2:
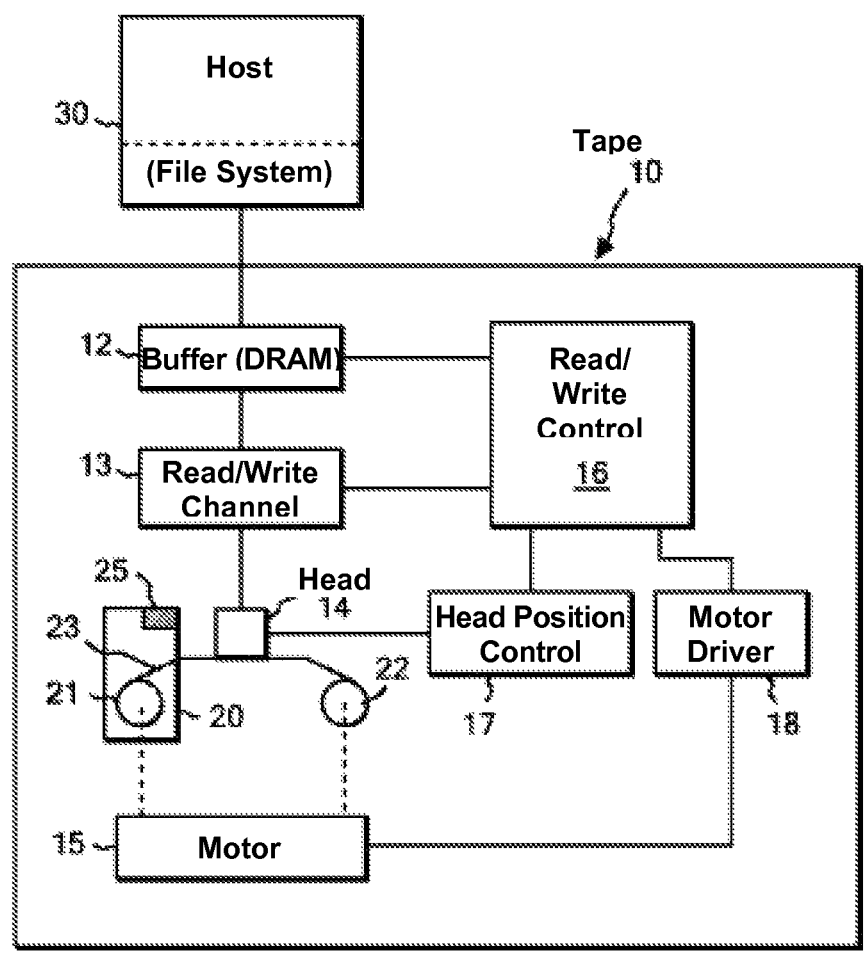
FIG. 2 provides an embodiment of a tape drive.

FIG. 2 shows an embodiment of a tape drive. A tape drive 10 reads and writes a plurality of data units sent from a host 30 to a tape storage medium in data sets (DS) of a fixed length. The size of a data set (DS) is typically 4 MB. The host 30 sends read and write requests to the tape drive via a file system. When SCSI is used as the communication standard, the host 30 issues requests to the tape drive 10 to read or write data.

The tape drive 10 includes a buffer 12, a read/write channel 13, a head 14, a motor 15, and a reel 22 for winding tape 23. It also includes read/write control 16 (controller), a head position control system 17, and a motor driver 18. The motor 15 can be two separate motors. A tape cartridge 20 is detachably mounted in the tape drive 10.

The tape cartridge 20 includes tape 23 wound on a reel 21. As the reels 21, 22 rotate, the tape 23 moves in the longitudinal direction from reel 21 towards reel 22, or from reel 22 towards reel 21. The head 14 writes data to the tape 23 or reads data from the tape 23 as the tape 23 moves in the longitudinal direction. The motor 15 rotates the reels 21, 22. The tape cartridge 20 includes non-contact, non-volatile memory called cartridge memory (CM) 25. Data in the CM 25 installed in the tape cartridge 20 is read and written by the tape drive 10 in a non-contact manner. The CM 25 saves information on the attributes of the tape cartridge (called a tape directory). When data is read and written, the tape drive can extract the attribute information from the CM to perform perfect reading and writing.

The read/write control 16 controls the entire tape drive 10. Data is written to the tape 23 and read from the tape 23 in accordance with commands received from the host 30. The data is written to the tape 23 in DS units by the head 14 via the read/write channel 13. Also, the head position control system 17 and the motor driver 18 are controlled to perform backhitch.

The buffer 12 stores data to be written to the tape 23 and data read from the tape 23. The buffer 12 can be, for example, DRAM. The buffer 12 functions as a fast-in/fast-out (FIFO) ring buffer for stored data. The host transfer rate and the drive transfer rate usually do not match. The tape drive uses the buffer to absorb the difference between the host transfer rate and the drive transfer rate. For example, when data is being written, the tape drive temporarily stores data sent from the host in the buffer. Afterwards, the tape drive writes the data stored in the buffer to the tape medium. The buffer is divided into areas called segments. The size of these segments is several MB. Each segment stores DS units, which are the read/write units for the tape 23.

Figure 3:
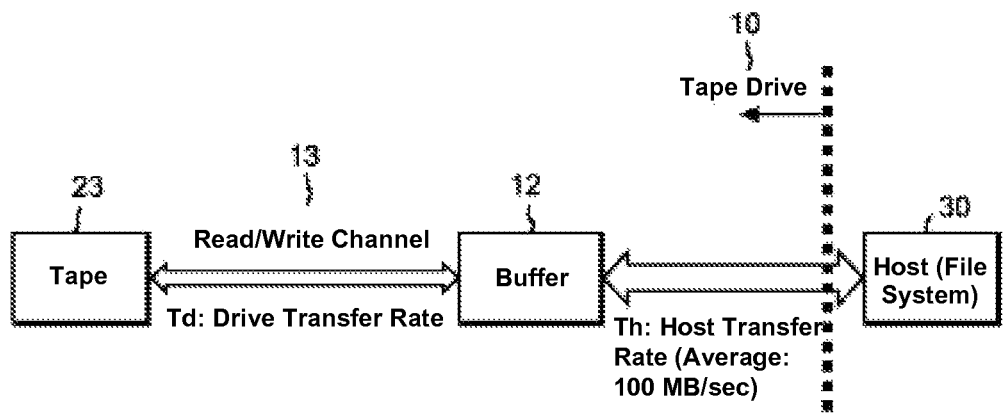
FIG. 3 provides an embodiment of the relationship to data transfer rates when the tape drive reads data from the host and receives a write request.

FIG. 3 shows the relationship to data transfer rates when the tape drive 10 reads data from the host 30 and receives a write request. Here, the host transfer speed and the drive transfer rate are different. The tape drive 10 improves data transfer performance by using a 1 GB buffer 12 to absorb the difference.

The following is an explanation of the relationship between the host transfer rate and the drive transfer rate when data is written from the host. The host 30 sends data at a uniform host transfer rate H (100 MB/s) during data writing. The read/ write control 16 in the tape drive 10 sends data from the buffer 12 to the tape 23 at a drive transfer rate D (200, 180, 160, 140, 120, 100, 80, 60, 40 or 20 MB/s). The tape drive 30 selects the perfect drive transfer rate from among these ten values to match the host transfer rate. The host transfer rate Th is determined by sampling several times during which there was an increase in the fixed data amount sent to the buffer 12. The drive transfer rate Td is determined by the speed of the tape 23 driven by the motor 15 (tape speed).

FIG. 4 shows an embodiment in which the tape speed is increased. FIG. 4a shows a situation in which the tape speed of the described embodiment is increased at a predetermined timing. When the host transfer rate is greater than the drive transfer rate, a speed change is performed during data writing (write) and data reading (read) without backhitch. A timing is selected so that the buffer is not full or empty at the time of the tape speed change, and a timing is selected so the reading and writing standby times for the host are minimized.

FIG. 4b shows a method of described embodiments for starting the acceleration from the current tape speed to the new tape speed at a predetermined timing for each data read/write unit. FIG. 4c shows the data segments written at the before and after tape speeds using the method of the described embodiments. When the method of the described embodiment is used to write data without backhitch, gaps occur between data during a speed change as shown in the drawings. The size of this gap depends on the tape speed before and after the change and on the required acceleration time. Generally, the tape interval is less than or equal to a fixed length, and is defined by a standard value (typically, 4 m) for the format when data is written to the tape medium. The standard value limits the target tape speed value.

FIG. 5 shows a flowchart for determining the timing when a tape speed change has been initiated. This is explained with reference to the function portion of FIG. 6 and both FIG. 7b and FIG. 8b. The current tape speed $S(n)$ indicates the flow of timing for a speed change.

At block 510, a speed change request is generated each time a unit of data (DS) is read or written.

At block 520, the measuring unit 31 measures the full area capacity (amount of partially full areas of data) (during writing) or the empty area capacity (during reading) (Abf[MB]) at the current time. Also, the inflow data rate to the buffer 12, that is, the host transfer rate Th [MB/s] is measured during writing (see FIG. 7b), and the outflow data rate from the buffer 12, that is, the host transfer rate Th [MB/s] is measured during reading (see FIG. 8b).

At block 530, the calculating unit 53 calculates the timing for the start of the tape speed change based on the amount of data. The read/write control 16 of the tape drive has secured as known parameters the tape acceleration A[m/s2], current tape speed $S(n)$, drive transfer rate Td [MB/s], target tape speed $S(n-1)$, and device margin $\alpha$. A calculated threshold value Bth is provided for the full area capacity (during writing) or the empty area capacity (during reading). When the required acceleration time is $Th=(S(n-1)-S(n))/A$ [s], capacity threshold value Bth ($Bth=Th \times T + \alpha$) is calculated.

At block, 540, the current Abf measured at block 520 is compared to the capacity threshold value Bth calculated at block 530. During writing, a tape speed change is determined (520) when the current measured empty capacity Abf is less than the calculated capacity threshold value Bth for the inflow (Yes). During reading, a tape speed change is determined (520) when the current measured full capacity Abf is less than the calculated capacity threshold value Bth for the outflow (Yes). When the current measured empty capacity Abf is greater than the calculated capacity threshold value Bth (No), the data storage state is changed in the buffer, and the measurement (520) and calculation (530) are repeated until the answer is Yes.

At block, 550, the determination unit 34 increases the current tape speed $S(n)$ in accordance with the timing of the change instruction in Step (540) until the target tape speed $S(n-1)$ has been reached. When the target tape speed has been reached, the tape drive operates so as to start writing data to the tape or to read data from the tape.

Figure 6:
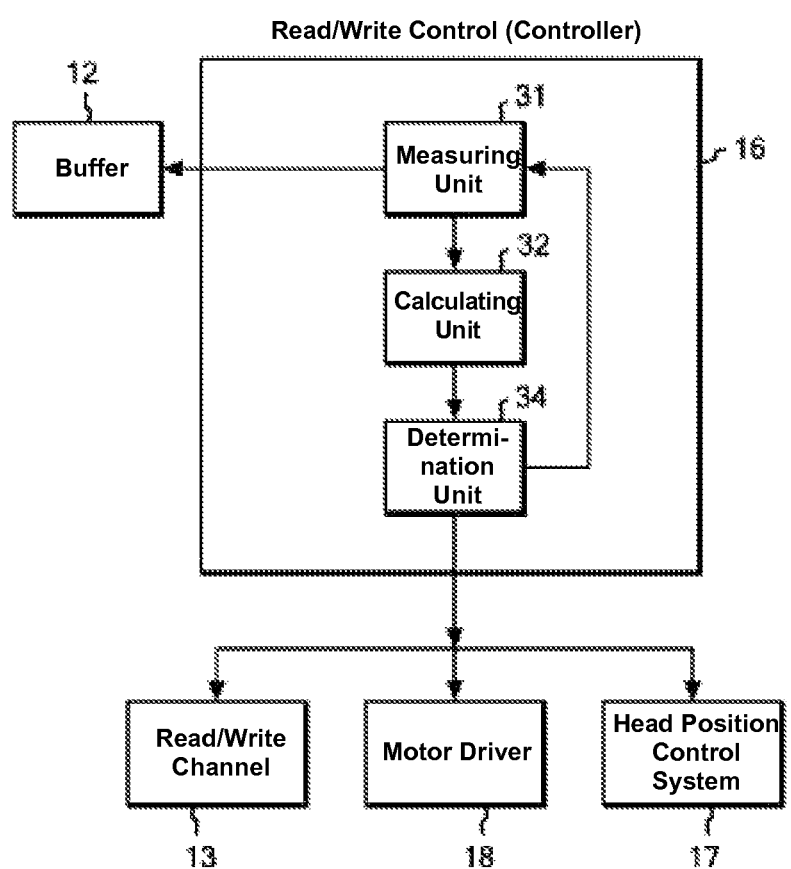
FIG. 6 provides an embodiment of function blocks of the read/write control 16 of the present invention.

FIG. 6 shows function blocks of the read/write control 16 of the present invention.

The measuring unit 31 measures the full area capacity (during writing) or the empty area capacity (during reading) Abf of the buffer 12 at the current time. It also measures the host transfer rate Th [MB/s] at the same time.

The calculating unit 32 calculates the timing for the start of the tape speed change based on the amount of data. It also provides a calculated capacity threshold value Bth for the full area capacity (during writing) or the empty area capacity (during reading).

The determination unit 34 compares the measured full area capacity (during writing) or empty area capacity (during reading) Abf measured at the start of a speed change to the calculated amount of inflow data (writing) or outflow data (reading) Bth.

When the tape speed can be changed in accordance with the comparison results, the determination unit outputs an acceleration instruction, etc. to the motor driver 18. The determination unit also instructs the read/write channel 13 and head position control system to start tape acceleration. When the current state of the buffer 12 (empty area capacity during writing or full area capacity during reading Abf) has no speed change timing, the determination unit has the measuring unit 31 and the calculating unit 32 repeat the operations described above.

FIGS. 7a and 7b show a conceptual diagram for determining the speed change timing so that the buffer does not become full during writing. The following is an explanation with reference to this drawing of the selection of a timing so that the buffer does not become full.

The acceleration of the running speed of the tape medium is A [m/s2]. This is approximately 10 [m/s2] for a typical drive.

The running speed of the tape medium is $S(i)$ [m/s], where i is one of ten running speeds ranging from 0 to 9, and where a lower value for i represents a faster running speed.

The transfer rate on the host side (host transfer rate) is Th [MB/s]. The transfer rate on the medium side (drive transfer rate) is Td [MB/s], and the running speed of the tape medium at this time is $S(n)$ [m/s].

FIG. 7a shows the timing for changing the current tape speed to the target tape speed. Because data is not written during the acceleration portion of a speed change, the read/write control 16 determines a speed-change timing that avoids a full buffer.

Because the host transfer rate is greater than the drive transfer rate (Th >Td), the buffer sometimes becomes full. A required acceleration time T of $(S(n-1)-S(n))/A$ [s] is sought to accelerate from the current tape speed $S(n)$ to the target tape speed $S(n-1)$ at A [m/s2].

FIG. 7b shows the amount of data stored in the buffer 12 at required acceleration time T. During time T, no data is written to the tape medium. If data were to flow into the empty area capacity of the buffer $(Abf=Th \times T=Th \times (S(n-1)-S(n))/A)$ [MB] at time T, the buffer would become full. Data does not flow out of the buffer at time T, either. If acceleration is from $S(n)$ to $S(n-1)$, the acceleration timing is for an empty area capacity of Bth=Th×T [MB] or less. Because Th is not actually constant during this time, the acceleration timing preferably should be given a bit more margin. When device margin a is provided and the empty area capacity is slightly larger, acceleration starts at Bth=Th×T+α [MB].

If reading data, a writing-skipped area is created during acceleration as explained in FIG. 4c. The tape interval is limited to a constant range, even in the case of an LTO tape drive and IBM Enterprise tape drive. Typically, the data set interval is within a standard value (for example 4 m). When determining the timing, a target tape speed S(n−1) has to be selected so that the tape interval is within 4 m.

FIGS. 8a and 8b show a conceptual diagram for determining the speed change timing so that the buffer does not become empty during reading. The following is an explanation with reference to this drawing of the selection of a timing so that the buffer does not become empty.

The acceleration of the running speed of the tape medium is A [m/s2]. This is approximately 10 [m/s2] for a typical drive.

The running speed of the tape medium is S(i) [m/s], where i is one of ten running speeds ranging from 0 to 9, and where a lower value for i represents a faster running speed.

The transfer rate on the host side (host transfer rate) is Th [MB/s]. The transfer rate on the medium side (drive transfer rate) is Td [MB/s], and the running speed of the tape medium at this time is S(n) [m/s].

FIG. 8a shows the timing for changing the current tape speed to the target tape speed. Because data is not read during the acceleration portion of a speed change, the read/write control 16 determines a speed-change timing that avoids an empty buffer.

Because the host transfer rate is greater than the drive transfer rate (Th >Td), the buffer sometimes becomes empty. A required acceleration time T of (S(n−1)−S(n))/A [s] is sought to accelerate from the current tape speed S(n) to the target tape speed S(n−1) at A [m/s2].

FIG. 8b shows the amount of data stored in the buffer 12 at required acceleration time T. During time T, no data is read from the tape medium. If data were to flow out of the full area capacity of the buffer (Abf=Th×T=Th×(S(n−1)−S(n))/A) [MB] at time T, the buffer would become empty. Data does not flow into the buffer at time T, either. If acceleration is from S(n) to S(n−1), the acceleration timing is for an empty area capacity of Bth=Th×T [MB] or less. Because Th is not actually constant during this time, the acceleration timing preferably should be given a bit more margin. When device margin a is provided and the full area capacity is slightly larger, acceleration starts at Bth=Th×T+α[MB]. If reading data, it has to be determined whether the skipped area during acceleration is within the range that can be recovered by ECC.

When reading data, data is essentially not read during acceleration. Therefore, a skipped area is created at the beginning of the data. If a skipped area occurs at the beginning of the data after a speed change but it is within a range that can be recovered using ECC correction codes as explained below, all of the data can be read and reproduced. Therefore, when determining a timing for a speed change during reading, a target tape speed S(n−1) has to be selected so that the skipped area is within a range that can be recovered by ECC.

With respect to FIGS. 7a, 7b, 8a, 8b, the speed-change timing during writing and reading is divided into a plurality of stages. If the transfer rate on the medium side (drive transfer rate) Td corresponding to the target tape speed S(n−1) is greater than the host transfer rate Th, the data is reduced and the buffer eventually becomes empty. If the drive transfer rate Td is less than the host transfer rate Th, the change can be divided into two stages: from S(n) to S(n−1) and then to S(n−2). It can be divided into three states so that it can be changed to an even faster tape speed S(n−3).

For example, in the following situation, it is decided whether or not it is necessary to divide the speed-change timing decision and the change to the target speed into a plurality of steps. When reading data, it is decided whether the skipped area is within a range that can be recovered by ECC. During the writing of data, it is decided whether the skipped area is within 4 m.

The following is an explanation of a speed-change timing during reading that is within the skipped area recoverably by ECC. For read/write control of the tape drive, the amount of data read during the required acceleration time T has to be within a data range recoverable by ECC because data cannot be read during acceleration. Typically, all of the original data can be recovered if the correcting capability of the correction codes of the tape drive can read only 108/128 of the original data. The data sets (DS) have a two-dimensional data structure in the buffer 12. In one column, 20 bytes of ECC correction codes (redundant information) are added to 108 bytes of data, and these 20 bytes perform code correction for 128 bytes as redundant information. The code correction method uses Reed-Solomon codes. Only redundant data can be recovered using ECC correction codes.

If 108/128 of the original data can be read, all of the original data can be recovered. When data is read at the speed after the change, all of the data can be recovered even if 20/128 (15%) of the data is lost (skipped).

In the reading method of the embodiments, no data is read during acceleration. Therefore, some of the data is lost at the beginning when the speed is changed without backhitch. When data is written to a tape medium by a Linear Tape Open (LTO) tape drive or IBM Enterprise tape drive (TS11x0), the error correction codes described above are added to the data. Therefore, when the present invention begins reading subsequent data on the read timing, the lost data can be recovered in the remaining data even when 15 to 20% of the data is lost at the beginning.

The length of data that can be lost depends on the generation of the tape medium, but the length L of data that can be skipped (lost) can be determined using the following formula.

$$L-M > (S+D/2) \times D/A$$

This equation has to be satisfied, where the speed-change width changeable during reading is D, the acceleration of the tape medium is A, the tape speed before the speed change is S, and the error margin is M.

Left Side: The left side of the equation expresses the skippable length. For example, if the length of one data set (DS) is 10 [cm], and the ECC is 20% of 1 DS, L is 2 [cm]. When half of the 2 [cm] ECC is used for error correction during reading, M is 1 [cm]. Therefore, the skippable length during acceleration is L−M or 1 [cm].

Right Side: The right side of the equation expresses the distance the tape advances during acceleration. The tape speed before the change is S, and the speed change width, or the difference between the tape speed after the change and the tape speed before the change, is D. If the acceleration is constant, the average tape speed during acceleration is (S+D/2)=((S)+(S+D))/2. The required acceleration time T is D/A, where A is the acceleration of the tape. This D/A is equal to the expression T=(S(n−1)−S(n))/A. Therefore, the distance the tape advances during acceleration/deceleration can be expressed as the product of the average tape speed during acceleration (S+D/2) [m/s] and the required acceleration time T=D/A [s].

Significance of the Equation: The changeable speed width D should be defined so that the right side of the equation representing the distance that the tape advances during acceleration is shorter than the right side of the equation representing the skippable length. If the read timing is restricted so as to provide width D, ECC recovery is possible even when some of a data set (DS) is skipped during acceleration. The change timing and target speed S(n−1) explained in FIG. 8 are provided so that a speed-change width D (S(n−1)−S(n)) that satisfies the equation is provided.

Figure 9:
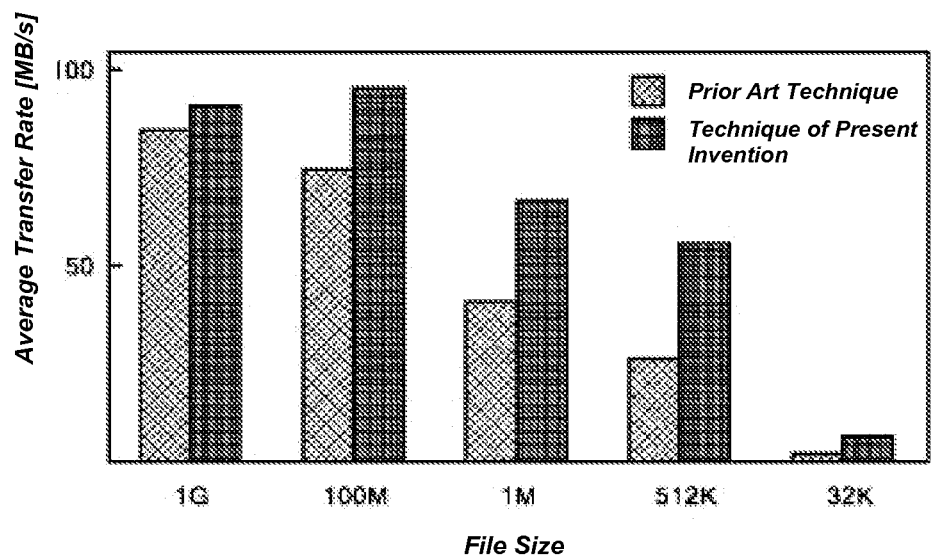
FIG. 9 shows the performance of a write method of the prior art and the write method of the present invention.

FIG. 9 shows the performance of a write method of the prior art and the write method of the described embodiments. In order to measure the results of the described embodiments, the transfer rates used to repeatedly write 32 KB, 512 KB, 1 MB, 100 MB and 1 GB size samples were measured using an actual tape drive. The results were then compared. The tape drive wrote the data to the tape medium in 4 MB data set units as the internal write data set unit. FIG. 9 shows the results in the form of a graph. The horizontal axis denotes the file size, and the vertical axis denotes the average transfer rate when the different size files were repeatedly written to the tape medium. It is clear that use of the described embodiments improves the long-term transfer rate by 20 to 50% compared to the prior art technique in which matching is performed using backhitch.

The present invention was explained with reference to embodiments, but the scope of the present invention is not limited to the described embodiments. It should be apparent to those skilled in the art that the embodiment can be modified in various ways without departing from the spirit and scope of the present invention.

What is claimed is:

1. A storage device in communication with a higher-level device and a tape medium for storage of a plurality of data sets sequentially, comprising:
    a buffer for temporarily storing data transmitted between the higher-level device and the tape medium; and
    a read/write control unit for reading and writing a plurality of data units sequentially in accordance with a read or write request from the higher-level device, the control unit increasing a tape speed from a current tape speed to a target tape speed on a predetermined speed-change timing to control the reading or writing of data between the buffer and the tape medium, wherein the predetermined speed-change timing is determined based on a required acceleration time to accelerate from the current tape speed to the target tape speed.

2. The storage device of claim 1, wherein the increasing the tape speed is performed when the host transfer rate for data with the higher-level device is greater than a drive transfer rate for data with the tape medium, and wherein the tape speed is increased so that the buffer does not become full during writing and the buffer does not become empty during reading.

3. The storage device of claim 1, wherein during writing from the higher level device to the tape medium, the predetermined speed-change timing is determined by comparing a currently-determined empty capacity of an empty area of the buffer to a capacity threshold value provided for an inflow data amount to the buffer in the required acceleration time such that a data capacity of the buffer is not full at the time of the change to the target tape speed.

4. The storage device of claim 3, wherein the capacity threshold value is calculated as a product of the host transfer rate and the required acceleration time.

5. The storage device according to claim 3, wherein a tape speed change is determined during writing when the empty capacity of the buffer determined at the current time is less than the capacity threshold value calculated based on the inflow data amount.

6. The storage device of claim 5, wherein the read/write control unit selects the target tape speed so that the segments of tape to which data is written before and after the speed change are within a standard value.

7. The storage device according to claim 3, wherein a value in which a storage device margin has been added to the capacity threshold value is compared to the measured capacity as the new capacity threshold value.

8. The storage device of claim 1, wherein during reading by the higher level device from the tape medium, the predetermined speed-change timing is determined by comparing a currently-determined full area capacity of a full area of the buffer to a capacity threshold value provided for an outflow data amount from the buffer in the required acceleration time such that a data capacity of the buffer is not empty at the time of the change to the target tape speed.

9. The storage device of claim 8, wherein a tape speed change is determined during reading when the full area capacity of the buffer determined at the current time is less than the capacity threshold value calculated based on the outflow data amount.

10. The storage device of claim 9, wherein the read/write control unit selects the target tape speed so that a skip distance in the required acceleration time is within an ECC recovery range.

11. A method for reading and writing a plurality of data units sequentially in accordance with a read or write request from a higher-level device with respect to a tape medium, comprising:
    increasing a tape speed from a current tape speed to a target tape speed on a predetermined speed-change timing to control the reading or writing of data between a buffer and the tape medium, wherein the predetermined speed-change timing is determined based on a required acceleration time to accelerate from the current tape speed to the target tape speed.

12. The method of claim 11, wherein the increasing the tape speed is performed when the host transfer rate for data with the higher-level device is greater than a drive transfer rate for data with the tape medium, and wherein the tape speed is increased so that the buffer does not become full during writing and the buffer does not become empty during reading.

13. The method of claim 11, wherein during writing from the higher level device to the tape medium, the predetermined speed-change timing is determined by comparing a currently-determined empty capacity of an empty area of the buffer to a capacity threshold value provided for an inflow data amount to the buffer in the required acceleration time such that a data capacity of the buffer is not full at the time of the change to the target tape speed.

14. The method of claim 13, wherein a tape speed change is determined during writing when the empty capacity of the buffer determined at the current time is less than the capacity threshold value calculated based on the inflow data amount.

15. The method of claim 11, wherein during reading by the higher level device from the tape medium, the predetermined speed-change timing is determined by comparing a currently-determined full area capacity of a full area of the buffer to a capacity threshold value provided for an outflow data amount from the buffer in the required acceleration time such that a data capacity of the buffer is not empty at the time of the change to the target tape speed.

16. The method of claim 15, wherein the a tape speed change is determined during reading when the full area capacity of the buffer determined at the current time is less than the capacity threshold value calculated based on the outflow data amount.

17. A read/write controller configured for implementation in a tape drive including a buffer and for reading and writing a plurality of data units sequentially in accordance with a read or write request from a higher-level device with respect to a tape medium, wherein a read/write control program performs operations, the operations comprising:
increasing a tape speed from a current tape speed to a target tape speed on a predetermined speed-change timing to control the reading or writing of data between the buffer and the tape medium, wherein the predetermined speed-change timing is determined based on a required acceleration time to accelerate from the current tape speed to the target tape speed.

18. The read/write controller of claim 17, wherein the increasing the tape speed is performed when the host transfer rate for data with the higher-level device is greater than a drive transfer rate for data with the tape medium, and wherein the tape speed is increased so that the buffer does not become full during writing and the buffer does not become empty during reading.

19. The read/write controller of claim 17, wherein during writing from the higher level device to the tape medium, the predetermined speed-change timing is determined by comparing a currently-determined empty capacity of an empty area of the buffer to a capacity threshold value provided for an inflow data amount to the buffer in the required acceleration time, such that a data capacity of the buffer is not full at the time of the change to the target tape speed.

20. The read/write controller of claim 19, wherein a tape speed change is determined during writing when the empty capacity of the buffer determined at the current time is less than the capacity threshold value calculated based on the inflow data amount.

21. The read/write controller of claim 17, wherein during reading by the higher level device from the tape medium, the predetermined speed-change timing is determined by comparing a currently-determined full area capacity of a full area of the buffer to a capacity threshold value is provided for an outflow data amount from the buffer in the required acceleration time such that a data capacity of the buffer is not empty at the time of the change to the target tape speed.

22. The read/write controller of claim 21, wherein the data-change timing during reading is such that the full area capacity of the buffer determined at the current time is less than the capacity threshold value calculated based on an outflow data amount.

* * * * *